J. V. HUSTAN.
VEHICLE AXLE.
APPLICATION FILED MAY 11, 1909.
937,530.
Patented Oct. 19, 1909.
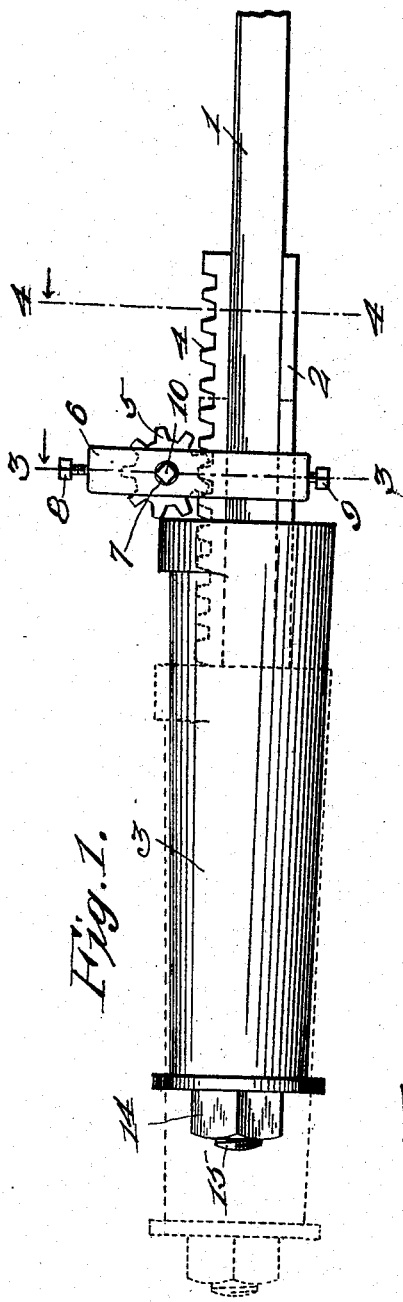
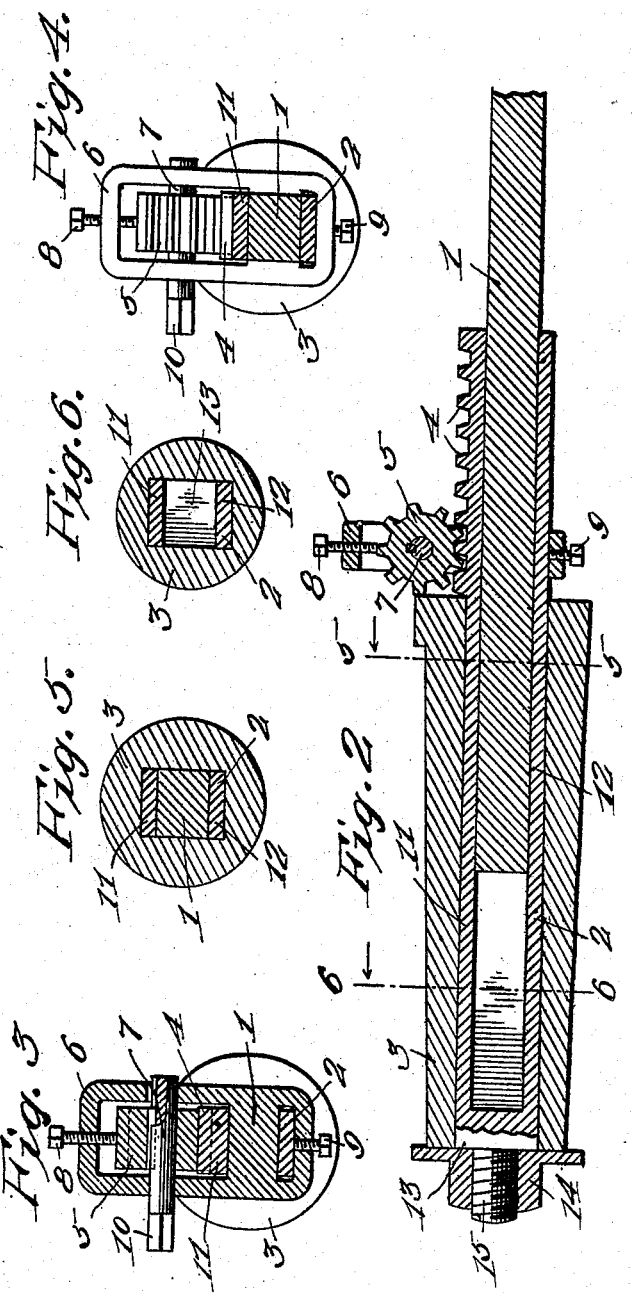

UNITED STATES PATENT OFFICE.

JAMES VICTORY HUSTAN, OF HAVANA, ILLINOIS, ASSIGNOR OF ONE-HALF TO DAVID SCHOONOVER, OF HAVANA, ILLINOIS.

VEHICLE-AXLE.

937,530.   Specification of Letters Patent.   Patented Oct. 19, 1909.

Application filed May 11, 1909. Serial No. 495,292.

*To all whom it may concern:*

Be it known that I, JAMES VICTORY HUS-TAN, a citizen of the United States, residing at Havana, in the county of Mason and State of Illinois, have invented certain new and useful Improvements in Vehicle-Axles, of which the following is a specification, reference being had to the accompanying drawings.

This invention relates to improvements in vehicle axles and more particularly one composed of extensible sections, whereby the wheels of the vehicle may be disposed nearer to or farther from each other to vary the gage of the vehicle.

The object of the invention is to provide a simple and practical device of this character, the parts of which may be quickly and easily adjusted and which will be substantially as strong and durable as the usual one-piece metal axle.

With the above and other objects in view, the invention consists of the novel features of construction and the combination and arrangement of parts hereinafter fully described and claimed, and illustrated in the accompanying drawings, in which—

Figure 1 is a side elevation of one end of a vehicle axle showing the application of the invention thereto; Fig. 2 is a longitudinal section; Figs. 3 and 4 are sections taken on the planes indicated by the lines 3—3 and 4—4 in Fig. 1; and Figs. 5 and 6 are sectional views taken, respectively, on the planes indicated by the lines 5—5 and 6—6 in Fig. 2.

In the drawings 1 denotes the main section or body portion of a metal axle and 2 denotes a slidable and adjustable section which carries a spindle 3 for the vehicle wheel. Said spindle carrying section 2 is adapted to telescopically receive the end of the main section 1 and it is adjusted and secured in adjusted position by providing upon its inner end rack teeth 4 which mesh with a pinion 5 arranged in a frame 6 on the axle section 1 and fixed to a transverse shaft 7 journaled in said frame. Said shaft is adapted to be rotated by a wrench or other tool to cause the pinion 5 to move the rack 4 and hence the axle section 2 longitudinally on the main section 1. The frame 6 is of rectangular shape and surrounds the axle section 1, its side portions being welded or otherwise secured to said section 1, as shown more clearly in Fig. 3. In the top and bottom portions of the frame 6 are provided set screws 8, 9, the former of which impinges against the pinion 5 and the latter against the bottom of the axle section 2 so that the parts will be effectively retained in adjusted position when said set screws are tightened. On one of the projecting ends of the shaft 7 is a squared or flat faced portion 10 adapted to receive a wrench or other tool by means of which the shaft may be readily rotated. The slidable or telescoping axle section 2 is preferably of U-form and consists of top and bottom bars 11, 12 which are united at their outer ends by a connecting end portion 13 and which slidably engage the top and bottom faces of the main axle section 1, which latter is preferably of rectangular shape in cross section. The spindle 3 is suitably shaped to receive the vehicle wheel and it is formed with an opening shaped to receive the outer portion of the section 2. Said spindle is retained on the axle section 2 by a nut 14 engaged with a reduced screw threaded stem 15 which projects from the end portion 13 of the axle section 2, as clearly shown in Fig. 2 of the drawings.

From the foregoing it will be seen that the invention provides an exceedingly simple device of this character which may be produced at a comparatively small cost, will be strong and durable and by means of which the wheels on the axle may be quickly and easily disposed nearer to or farther from each other to vary the gage of the wagon or other vehicle. By simply loosening the set screws 8, 9 and turning the shaft 7 the axle section 2 may be slid longitudinally on the main section 1, and when adjusted to the desired position may be locked by tightening the set screws 8, 9.

While I have shown and described in detail the preferred embodiment of the invention, it will be understood that various changes in the form, proportion and arrangement of parts and in the details of construction may be resorted to within the spirit and scope of the invention.

Having thus described the invention what is claimed is:

1. A vehicle axle comprising a main section, an extensible spindle carrying section, a rack and pinion device for adjusting the latter, and means securing said spindle carrying section in adjusted position.

2. A vehicle axle comprising a main section, an extensible spindle carrying section and a rack and pinion device for adjusting the latter.

3. A vehicle axle comprising a main section, an extensible spindle carrying section, a rack and pinion device for moving the spindle carrying section longitudinally on the main section and a set screw for securing said spindle carrying section in adjusted position.

4. A vehicle axle comprising a main section, a slidable section on the main section, a spindle removably secured on the slidable section, a rack carried by the slidable section, a frame carried by the main section, a shaft in said frame and having a flat faced portion to receive a wrench or the like, a pinion fixed to said shaft and in mesh with said rack and a set screw for securing said slidable axle section in adjusted position.

5. A vehicle axle comprising a main section having flat faces, a slidable section of U-form adapted to receive the main section and slide thereon, a reduced threaded stem upon the closed outer end of the slidable axle section, a spindle arranged on the outer portion of the slidable axle section, a nut upon said stem to retain the spindle upon said slidable axle section and means for adjusting said slidable axle section and retaining it in adjusted position.

In testimony whereof I hereunto affix my signature in the presence of two witnesses.

JAMES VICTORY HUSTAN.

Witnesses:
  C. D. TERRELL,
  OSCAR L. HUSTAN.